United States Patent [19]

Teer et al.

[11] 3,978,017

[45] Aug. 31, 1976

[54] PRODUCTION OF HIGH SOLIDS CONTAINING POLYETHYLENE EMULSIONS

[75] Inventors: Glenn E. Teer; Jerry G. Higgins; George D. Warren, all of Big Spring, Tex.

[73] Assignee: Cosden Technology, Inc., Big Spring, Tex.

[22] Filed: Feb. 7, 1975

[21] Appl. No.: 547,947

[52] U.S. Cl. ............... 260/29.6 XA; 260/29.6 MQ
[51] Int. Cl.² ............................................ C08L 23/06
[58] Field of Search ............ 260/29.6 XA, 29.6 MQ, 260/94.9 A

[56] References Cited
UNITED STATES PATENTS

| | | | |
|---|---|---|---|
| 3,352,807 | 11/1967 | Helin et al. | 260/29.6 XA |
| 3,380,945 | 4/1968 | Deex et al. | 260/29.6 XA |
| 3,400,089 | 9/1968 | Bestian et al. | 260/29.6 XA |

*Primary Examiner*—M. J. Welsh

[57] ABSTRACT

Stable polyethylene emulsions are produced having a solids content of at least about 30% by weight in a polymerization process without the necessity of a concentration step by contacting ethylene with an aqueous reaction medium containing from about 0.5 to about 1.5 weight percent of a water soluble persulfate initiator and from about 5.5 to about 10.0 weight percent of an alkyl benzene sulfonate emulsifier and allowing the reaction to proceed until at least about 30 weight percent solids level is obtained. The resulting polymeric emulsions are stable and surprisingly have superior properties to polyethylene emulsions which are conventionally produced at lower solids levels and then concentrated to the higher solids level.

11 Claims, No Drawings

PRODUCTION OF HIGH SOLIDS CONTAINING POLYETHYLENE EMULSIONS

BACKGROUND OF THE INVENTION

This invention relates to polymeric emulsions. In another aspect, this invention relates to the formation of high solids polyethylene emulsions directly by emulsion polymerization.

Stable polyethylene emulsions are conventionally utilized as components within surface treating and coating compositions such as lacquers, paints and polishes. Improved polyethylene emulsions are made with the use of water soluble persulfate catalysts and non-ionic and fatty acid type anionic emulsifiers in U.S. Pat. No. 3,226,352 and U.S. Pat. No. 3,244,625, respectively. Such improved emulsions are formed by polymerizing ethylene in an aqueous medium to a relatively low solids level and later concentrating the product emulsion to a relatively high solids level.

Furthermore, improved stable emulsions of polyethylene have been produced utilizing a persulfate catalyst and an alkyl aryl sulfonate type emulsifier by the process disclosed in U.S. Pat. No. 3,352,807. According to the process of U.S. Pat. No. 3,352,807 the water soluble persulfate initiator is present in concentrations of less than about 0.5 weight percent of the reaction medium and up to about 5 weight percent of the reaction medium of an alkyl aryl sulfonate emulsifier system which comprises at least 50 weight percent of an emulsifier which contains at least one alkyl group which is attached to the aromatic ring through a secondary or tertiary carbon atom. The latexes produced in accordance with this process are stable and are generally produced at a solids level of from about 17 to 20 weight percent and then later concentrated to a solids content of from about 40 to about 55 weight percent.

Thus, the processes for producing stable polyethylene emulsions generally include the formation of an initial emulsion in a reaction zone and thereafter a concentration step such as carried out in a conventional concentration unit such as a falling film evaporator preferably operated under vacuum to strip a portion of the liquid phase therefrom and form a polymer emulsion at a higher solids level.

STATEMENT OF THE INVENTION

According to the invention, stable polyethylene emulsions having a high solids content are produced directly in an emulsion polymerization process utilizing an alkyl benzene sulfonate emulsifier and a water soluble persulfate initiator. More specifically, the improved process of the subject invention comprises introducing an aqueous reaction medium containing from about 5.5 to about 10 weight percent of an alkyl benzene sulfonate emulsifier and from about 0.5 to about 1.5 percent by weight of a water soluble persulfate initiator into an agitated reaction zone and contacting the aqueous medium with ethylene under greater than atmospheric pressure and allowing the polymerization to continue until a solids level of at least about 30 weight percent is obtained. In general, we have discovered that by increasing the amount of water soluble persulfate initiator and the amount of the alkyl benzene sulfonate emulsifier to levels greater than conventionally utilized, and thereafter allowing the reaction to proceed until a high solids level is obtained, a product of high solids level is obtained which has improved qualities over the conventionally produced emulsions which are polymerized to the low solids level and later concentrated. Thus, the product produced by the subject invention is almost transparent, has minimal flock and has generally a smaller particle size than that produced by the conventional processes which require concentration steps. The added benefit of eliminating the costly energy requiring evaporation step is also present.

DETAILED DESCRIPTION OF THE INVENTION

The improved high solids containing polyethylene emulsions are produced in accordance with the subject invention either under batch or continuous process conditions. In each instance, pressurized ethylene is contacted with an aqueous medium which contains the water soluble persulfate initiator, and the alkyl benzene sulfonate emulsifier. Thus contact of the ethylene with the aqueous medium is made under greater than atmospheric pressure and at elevated temperatures. Generally, the polymerization temperature can range from about 70°C to about 120°C and pressure can range from about 1400 psi to about 4500 psi.

Examples of suitable water persulfate initiators include alkali metal persulfates such as potassium and sodium persulfate and any other water soluble persulfate, e.g., ammonium persulfate and the like. The water soluble persulfate is preferably present in the aqueous medium in amounts ranging from about 0.5 to about 1.5% by weight of the aqueous reaction medium and preferably from about 0.6 to about 1.3% by weight of the aqueous reaction medium.

Suitable alkyl benzene sulfonate emulsifiers which can be used in the scope of the subject invention include the alkali metal salts and particularly the sodium and potassium salts of the alkyl benzene sulfonates wherein the alkyl group is a straight or branched chain group which contains from about 6 to about 18 carbon atoms. Examples of suitable such material include the sodium and potassium salts of dodecyl benzene sulfonic acid, nonyl benzene sulfonic acid, undecyl benzene sulfonic acid, tetradecyl benzene sulfonic acid, hexadecyl benzene sulfonic acid, mixtures thereof, and the like. The emulsifier is present in an amount ranging from about 5.5% to about 10% by weight of the aqueous reaction medium, and preferably in amounts ranging from about 6% to about 8% by weight of the aqueous medium.

The reaction can be carried out in either a batch or continuous operation. In carrying out the polymerization process in accordance with the present invention, water, the emulsifier, and the initiator are combined in any order in the amounts or proportions which are recited above. The components are mixed in a suitable pressure reactor, or a premixed aqueous phase is introduced into the suitable aqueous reactor. The reactor is equipped with a stirring mechanism in which fairly vigorous agitation of the contents is possible either by motion of the reactor or by agitating means of the reactor. The reactor is suitably made of a corrosion resistant material such as stainless steel or is equipped with a corrosion resistant lining such as glass or stainless steel. The reactor is then flushed with polymerization grade (99.8+% pure) ethylene to remove gaseous oxygen from the system. Preferably the polymerization grade ethylene contains less than 10–25 ppm of oxygen.

In some instances, it is desirable to initially add all ingredients but the initiator to the reactor and then heat the reactor to the operating temperature as set forth above, and then the initiator is introduced into the reactor, conveniently dissolved in a portion of the water component of the aqueous medium. In this instance, the initiator is conveniently added to the reaction zone in a sufficient quantity to produce a polymerization rate of about 10% per hour.

High pressure polymerization grade ethylene is introduced into the reactor. The pressure of the ethylene can be dependent upon the emulsifier as stated above. The reaction proceeds at the temperatures and pressures set forth above with constant vigorous agitation of the liquid contents of the reactor. As the polymerization proceeds, additional ethylene is continuously fed into the reactor to maintain the pressure. The polymerization is permitted until the emulsion reaches the desired solids content. This can be done by periodically withdrawing samples from the reactor and plotting the solids content as a function of time. A leveling off of the plotted solids content indicates that the reaction is slowing down and that the initiator is becoming depleted by thermal decomposition. When this happens, additional initiator can be added in small increments to maintain the polymerization rate of about 10% per hour. The reaction should be allowed to continue until the emulsion has a solids content of at least about 30% by weight and preferably between about 35 and 45% by weight thereof.

It is noted that with conventional amounts of initiator and alkyl benzene sulfonate, emulsifiers which are at lower levels than those utilized in accordance with the subject invention, emulsions containing a solids content of about 18 weight percent were manufactured at a maximum production rate of about 1400 pounds per hour in a particular plant. However, the inventors found that the increase in the initiator and alkyl benzene sulfonate emulsifier to levels in accordance with the subject invention, polyethylene emulsions having a solids level of 40 weight percent were produced by the same plant at a maximum rate of 2000–2500 pounds per hour. Thus, the small increase in initiator and emulsifier almost doubled the polymer production in the plant without the added cost of thermal evaporation. In addition, it was quite surprising that the resulting product produced at the higher solids level was of superior quality than that heretofore conventionally produced at the lower solids level and then later concentrated to the higher solids level. The emulsion product of the subject invention can be shipped and utilized in various surface treating compositions such as polishes, paints, and lacquers without first being concentrated. Furthermore, if desired, the emulsion product of the subject invention can be concentrated to even higher solids levels by removal of water by conventional techniques, such as a falling film evaporator operated under vacuum.

The following examples are set forth to better facilitate the understanding of this invention and are not intended to limit the scope thereof:

EXAMPLE I

A high pressure stainless steel batch reactor equipped with a stirring mechanism was charged with an aqueous solution containing 90 parts by weight of deionized water, 7.4 parts by weight of dodecyl benzene sulfonic acid, 1.25 parts by weight of potassium persulfate, and 1.35 parts by weight of sodium hydroxide. The reactor was flushed, sealed and heated to 85°C and pressurized to 1700 psi with polymerization grade ethylene containing less than 25 ppm of oxygen. The stirrer was started and reaction was allowed to proceed at the above temperature and pressure conditions for between about 3 and 4 hours until the aqueous solution had a total solids content of between 38 and 40 weight percent. The resulting product was an almost transparent stable latex with no sediment, flock or visible particles present and had the properties set forth in Table 1 below.

Table 1

| | |
|---|---|
| Total solids | 39.40 wt % |
| Total polymer in emulsion | 33.15 wt % |
| Emulsifier | 5.06 wt % |
| Surface tension | 51.5 dynes/cm$^2$ |
| pH | 12.4 |
| Brookfield viscosity (No. 2 spindle at 60 rpm) | 30.00 cps |
| Transmittance | 88.00% * |
| Inherent viscosity | 0.45 dl/g |

* As determined by a Bausch & Lomb "Spectronic 20" spectrophotometer using distilled water as the 100% transmission calibration standard, and using a wave length of 620 millimicrons using a ½ inch transmission cell.

EXAMPLE II

A 2000 gallon high pressure stainless steel continuous reactor was charged with a solution containing 90.35% by weight deionized water, 7.5% by weight of dodecyl benzene sulfonic acid, 1.4% by weight sodium hydroxide, and 0.75% by weight of potassium persulfate. The reactor was flushed and sealed and heated to 85°C and pressurized to 1700 psi with polymerization grade ethylene containing less than 25 ppm of oxygen. The reaction began immediately and the pressure was maintained in the interior of the reactor at a range of from 1700 to 2000 psi by means of an automatically operated control valve supplying ethylene from a compressor. The temperature was also automatically maintained at a level between 85°C and about 100°C by means of a thermostat and internal cooling coils. The reaction product was constantly withdrawn from the reactor at a rate to maintain a residence time of about 4–7 hours and a solids level of between about 38 and 40 weight percent. The resulting product was a translucent latex with no sediment or visible particles present and had the physical properties over a 72 hour production run as set forth in Table 2 below.

Table 2

| | |
|---|---|
| Total solids | 38–40 wt % |
| Total polymer in emulsion | 33–34 wt % |
| Emulsifier | 5.8–6.4 wt % |
| Surface tension | 27 dynes/cm$^2$ |
| pH | 6–8 |
| Brookfield viscosity (No. 2 spindle at 60 rpm) | 26–30 cps |
| Transmittance | 70–80% * |

* As determined by a Bausch & Lomb "Spectronic 20" spectrophotometer using distilled water as the 100% transmission calibration standard, and using a wave length of 620 millimicrons using a ½ inch transmission cell.

While this invention has been described in relation to its preferred embodiments, it is to be understood that various modifications thereof will now be apparent to one skilled in the art upon reading the specification and it is intended to cover such modifications as fall within the scope of the appended claims.

We claim:

1. A process of producing improved stable polyethylene emulsions of high solids content comprising:

a. introducing into a polymerization zone an aqueous reaction medium containing from 0.5 to about 1.5 weight percent thereof of water soluble persulfate initiator and from about 5.5 to about 10 weight percent of an emulsifier consisting essentially of an alkyl benzene sulfonate wherein the alkyl group has from about 6 to about 18 carbon atoms;

b. introducing ethylene into a reaction zone containing said aqueous medium at a pressure in the range of from about 15,000 psi to about 45,000 psi while agitating said aqueous medium and maintaining said polymerization zone at a temperature in the range of from about 70°C to about 120°C thereby forming polyethylene particles suspended in said aqueous medium; and c. allowing said polyethylene particles to form in said aqueous medium until a solids level of at least about 30 percent by weight thereof is obtained.

2. The process of claim 1 wherein said water soluble persulfate initiator is selected from the group consisting of alkali metal persulfates and ammonium persulfates.

3. The process of claim 2 wherein said initiator is alkali metal persulfate.

4. The process of claim 1 wherein said alkyl benzene sulfonate emulsifier is an alkali metal salt of an alkyl benzene sulfonic acid wherein the alkyl group is a straight or branched chain group which contains from about 6 to 18 carbon atoms.

5. The method of claim 4 wherein said alkyl benzene sulfonate is sodium dodecyl benzene sulfonate.

6. The process of claim 1 wherein said polyethylene particles are formed in said aqueous medium at a solids level of between about 35 and 45 percent by weight thereof.

7. The process of claim 1 carried out under batch process conditions.

8. The process of claim 1 carried out under continuous process conditions.

9. The improved stable polyethylene emulsion produced by the process of claim 1.

10. In a process for producing a stable polyethylene emulsion wherein ethylene is introduced into a reaction zone and contacted with an aqueous medium containing a water soluble persulfate initiator and an alkyl benzene sulfonate emulsifier, the improvement comprising:

increasing the solids level in said polyethylene emulsion without removing water there from by providing said initiator in a concentration of from about 0.5 to 1.5 weight percent of said aqueous medium, and said emulsifier in a concentration of from about 5.5 to about 10 weight percent of said aqueous medium and allowing said polymerization to be carried out until a solids level of at least about 30 percent by weight thereof is obtained.

11. The process of claim 10 wherein said emulsion is formed which has a solids content in the range of from about 35 percent to about 45 percent by weight thereof.

* * * * *